(No Model.) 6 Sheets—Sheet 1.

F. M. LEAVITT.
MACHINE FOR COILING WIRE.

No. 375,678. Patented Dec. 27, 1887.

WITNESSES:
Gustave Dieterich.
T. F. Bourne.

INVENTOR
Frank M. Leavitt
BY
Briesen & Steele
ATTORNEYS (No Model.)　　　F. M. LEAVITT.　　　6 Sheets—Sheet 2.
MACHINE FOR COILING WIRE.
No. 375,678.　　　Patented Dec. 27, 1887.
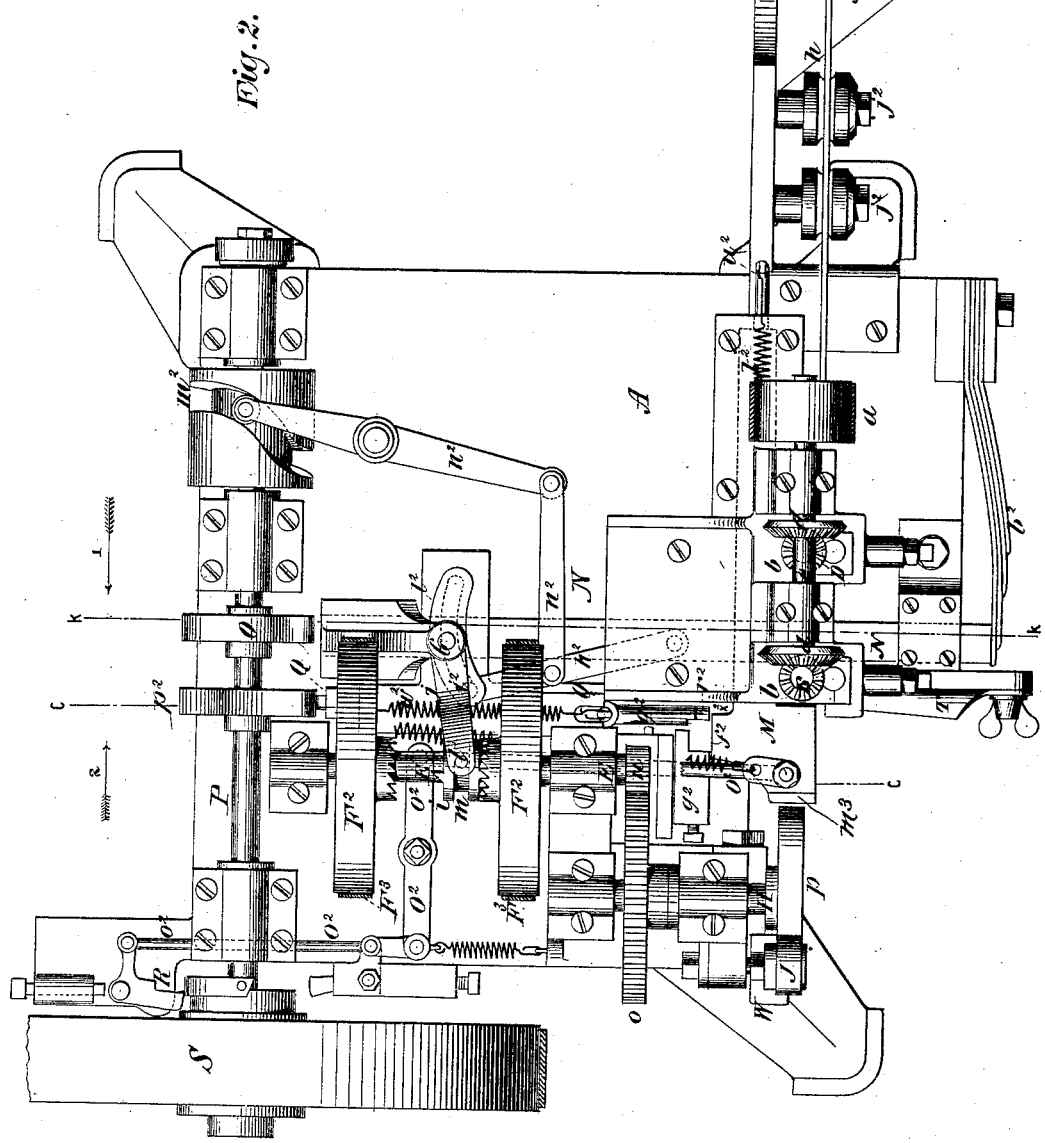
WITNESSES:
Gustave Dieterich
T. F. Bourne,
INVENTOR
Frank M. Leavitt
BY
Briesen & Steele
ATTORNEYS

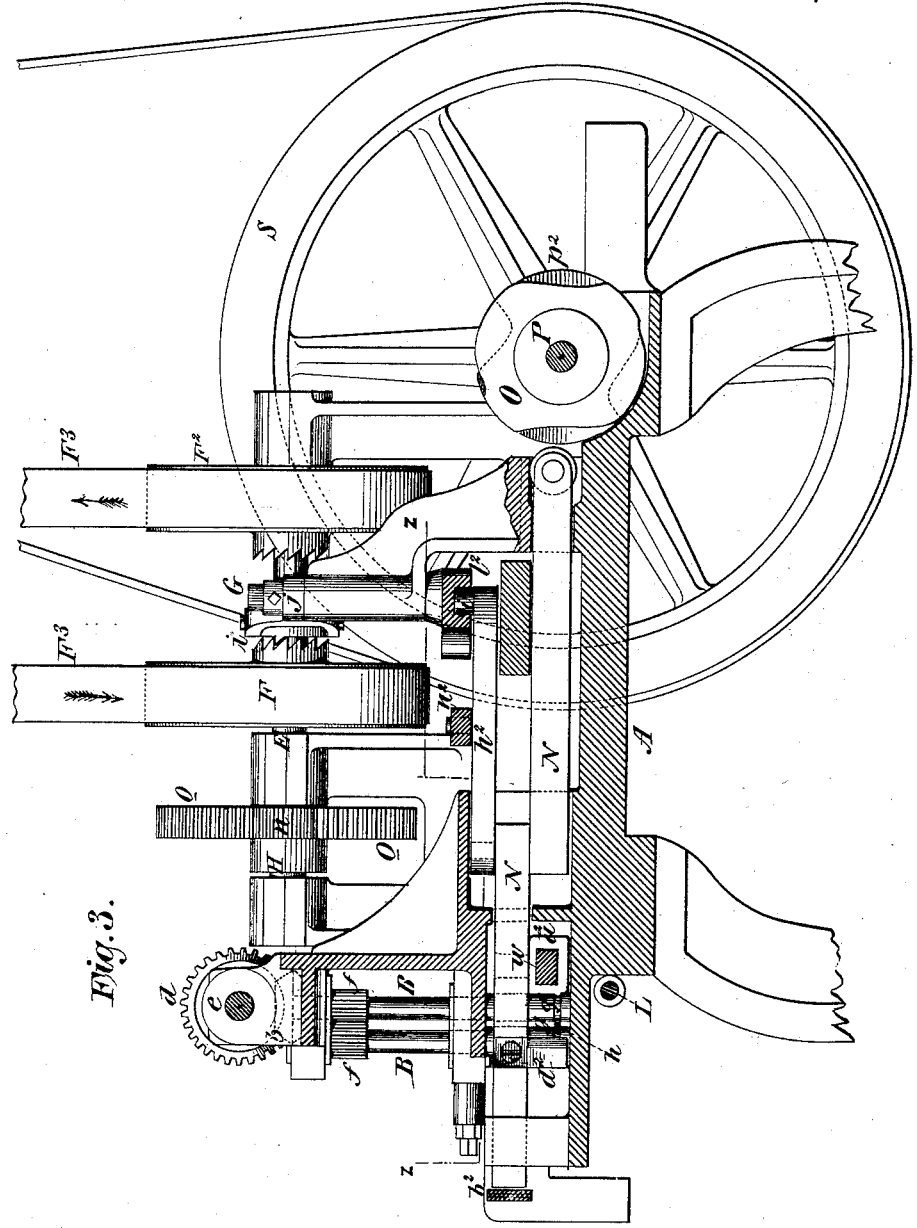

(No Model.) 6 Sheets—Sheet 4.
F. M. LEAVITT.
MACHINE FOR COILING WIRE.
No. 375,678. Patented Dec. 27, 1887.
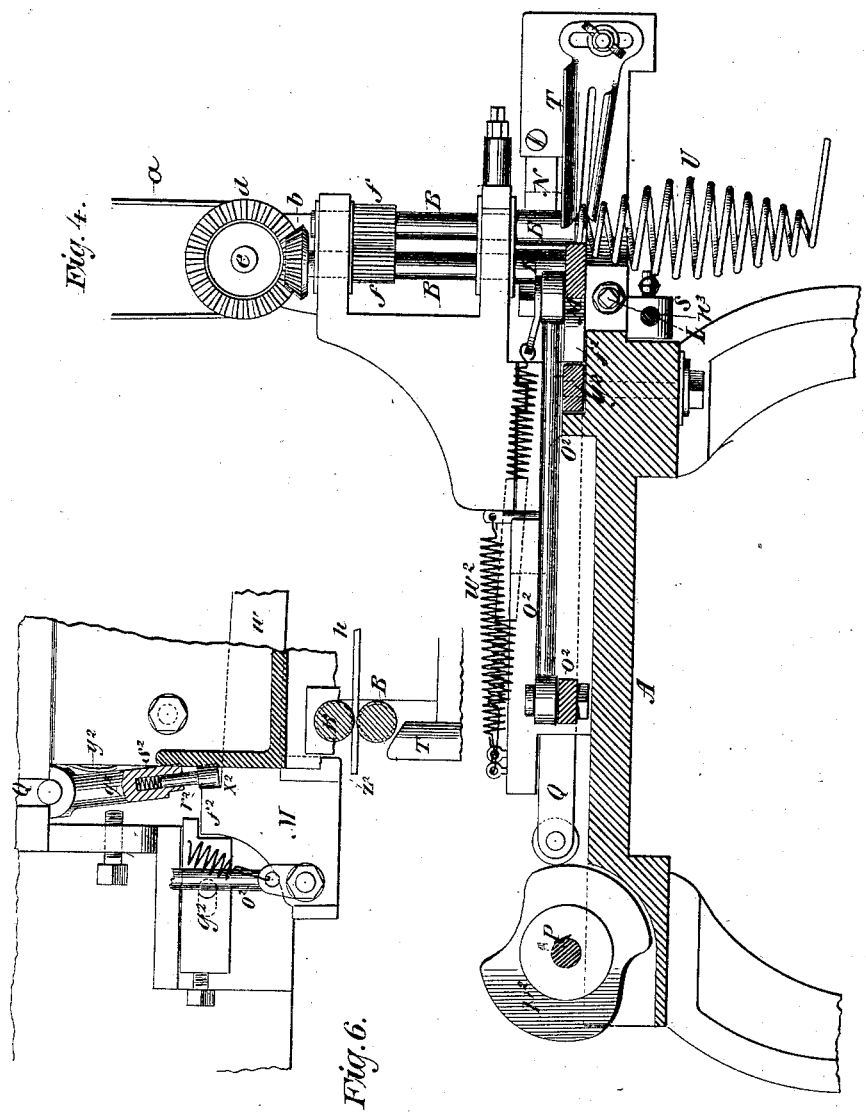
WITNESSES:
Gustave Dieterich
T. F. Bourne.
INVENTOR
Frank M. Leavitt
BY
Briesen & Steele
ATTORNEYS (No Model.) 6 Sheets—Sheet 5.
F. M. LEAVITT.
MACHINE FOR COILING WIRE.
No. 375,678. Patented Dec. 27, 1887.
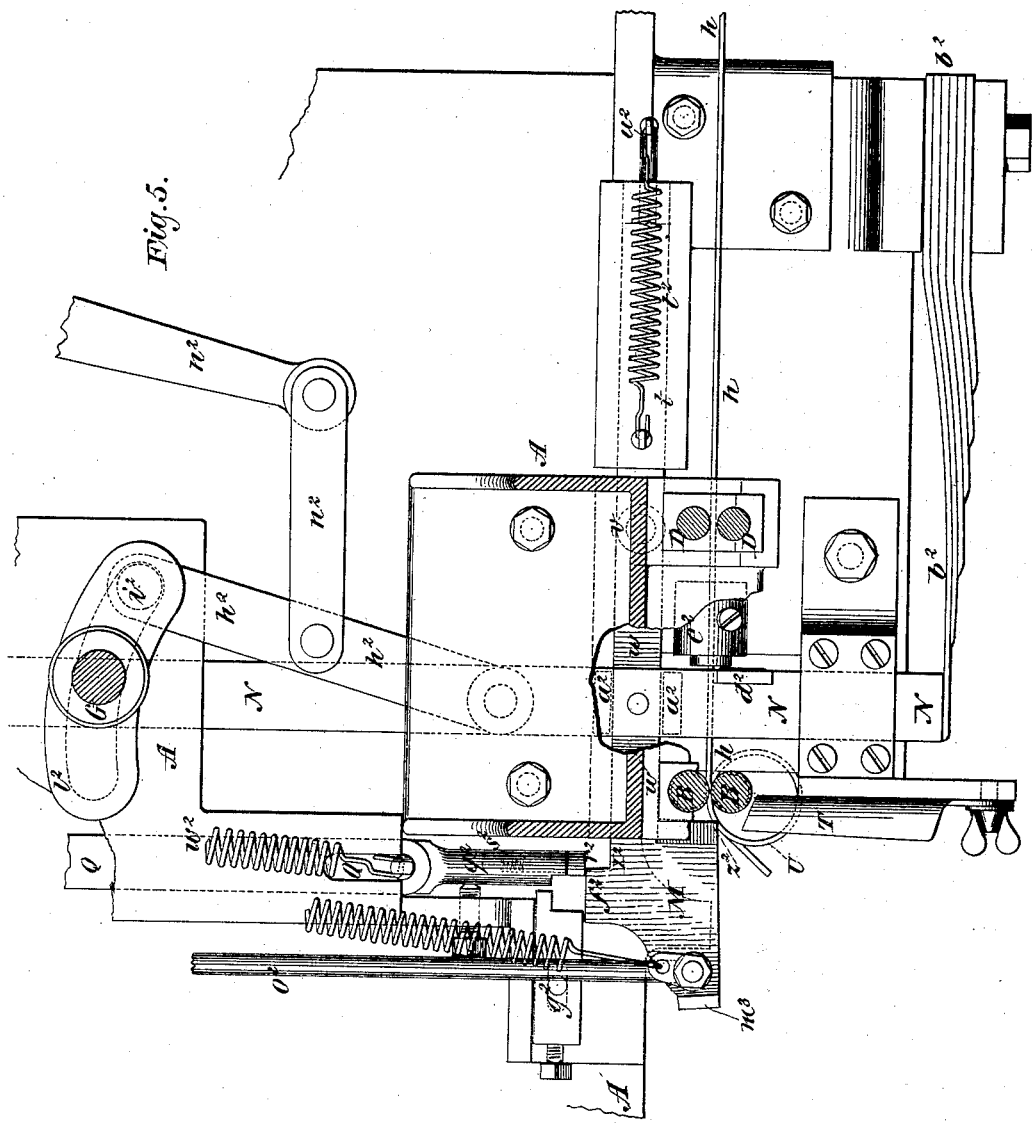
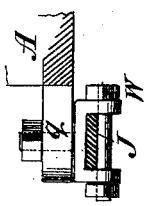
WITNESSES:
Gustave Dieterich
T. F. Bourne.
INVENTOR
Frank M. Leavitt
BY
Briesen & Steele
ATTORNEYS (No Model.)  6 Sheets—Sheet 6.

F. M. LEAVITT.
MACHINE FOR COILING WIRE.

No. 375,678.  Patented Dec. 27, 1887.

WITNESSES:
Gustave Dieterich
T. F. Bourne.

INVENTOR
Frank M. Leavitt
BY Briesen & Steele
ATTORNEYS.

UNITED STATES PATENT OFFICE.

FRANK M. LEAVITT, OF BROOKLYN, ASSIGNOR TO JACOB STETTHEIMER, OF NEW YORK, N. Y.

MACHINE FOR COILING WIRE.

SPECIFICATION forming part of Letters Patent No. 375,678, dated December 27, 1887.

Application filed May 23, 1887. Serial No. 239,076. (No model.)

*To all whom it may concern:*

Be it known that I, FRANK M. LEAVITT, of Brooklyn, Kings county, New York, have invented a new and Improved Machine for Coiling Wire, of which the following is a full, clear, and exact description.

The object of my invention is to produce a machine for forming coiled wire for spiral springs and other purposes.

The invention consists in the combination of a series of feed-rollers with an anvil or former for turning an advancing wire in the arc of a circle to form the coils, and with novel means for moving the anvil or former toward or from the feed-rollers to form different diameters in the coils.

The invention also consists in other details of construction and combinations of parts, that will be more fully hereinafter set forth and claimed.

Figure 1:
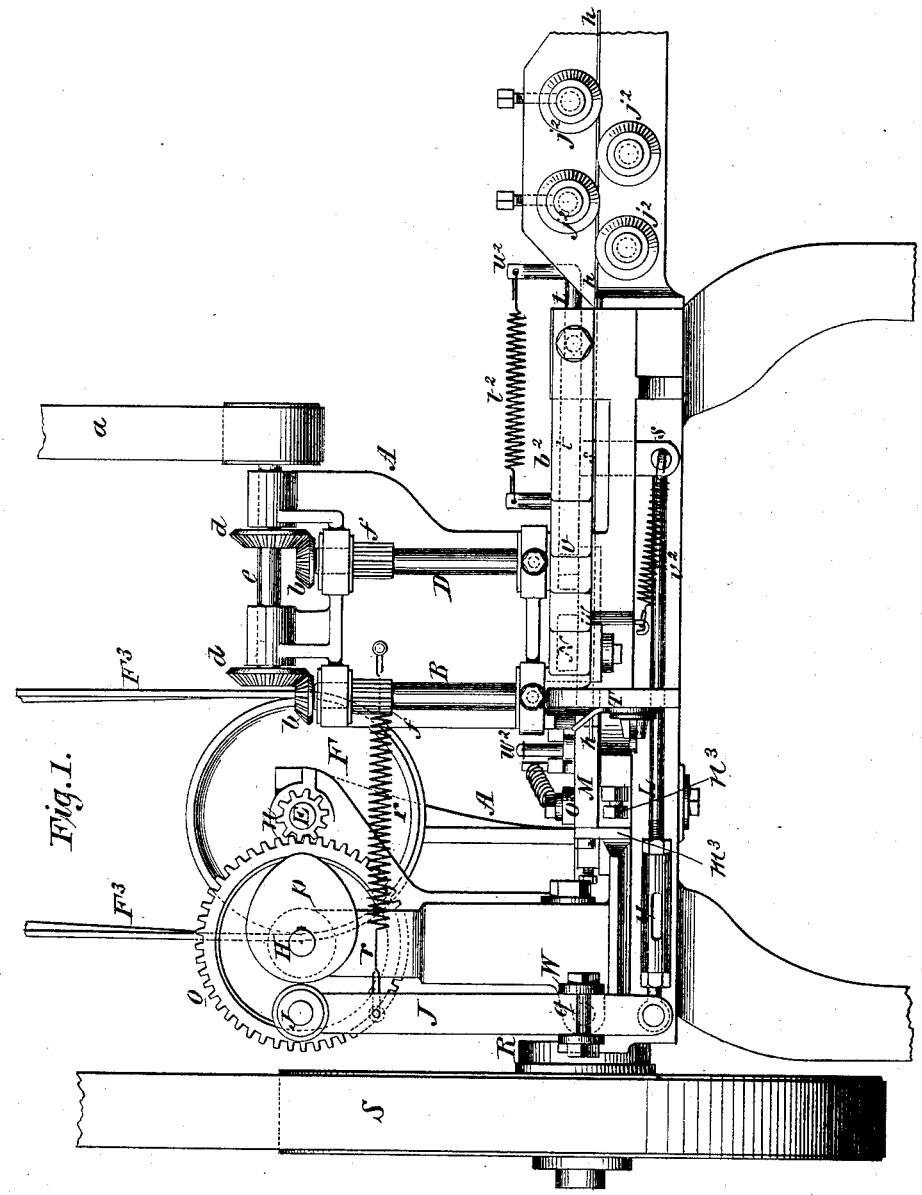
Figure 8:
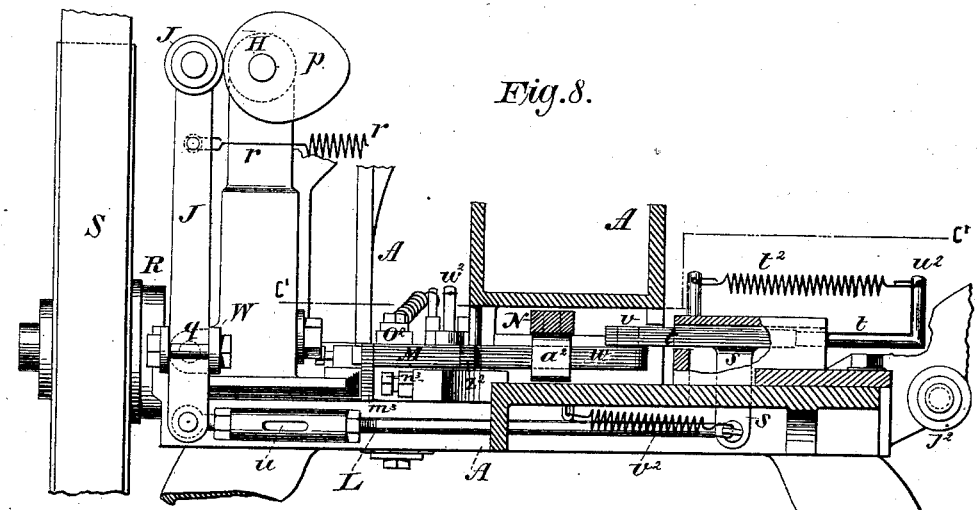
Figure 9:
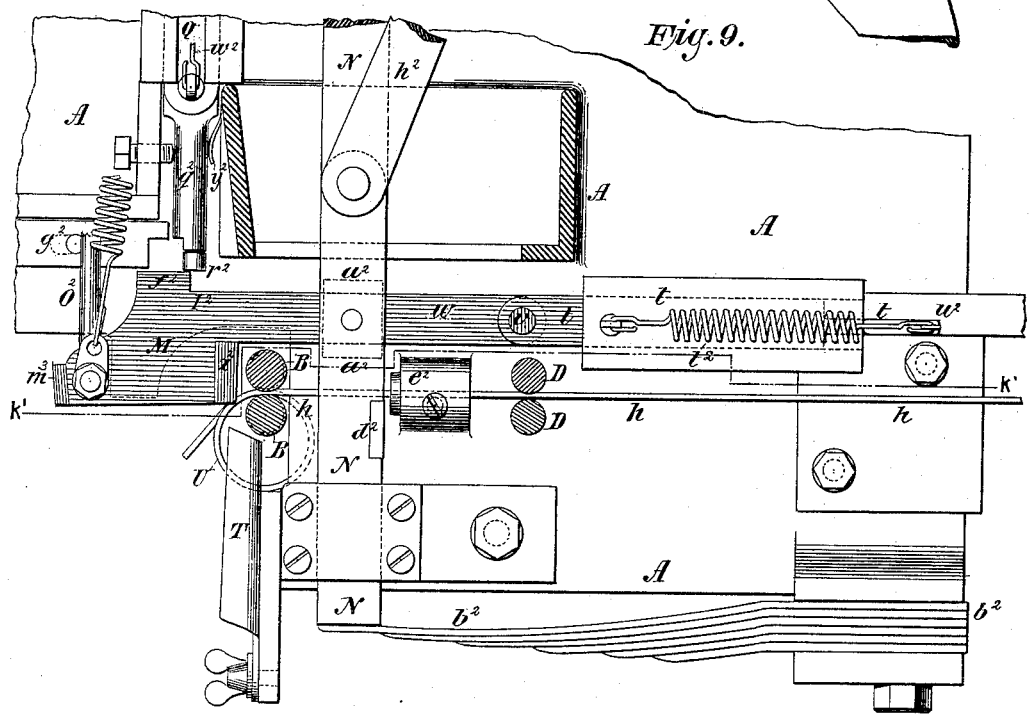

Reference is to be had to the accompanying drawings, forming part of this specification, in which Figure 1 is a side elevation of my improved machine. Fig. 2 is a plan view of the same. Fig. 3 is a vertical cross-section on line $k\,k$, Fig. 2, looking in the direction of the arrow 1. Fig. 4 is a vertical cross-section taken on line $c\,c$, Fig. 2, looking in the direction of the arrow 2. Fig. 5 is a horizontal section taken on the plane of the line $z\,z$, Fig 3. Figs. 6 and 7 are detail views hereinafter more fully referred to. Fig. 8 is a sectional side elevation of part of the machine, taken on the line $k'\,k'$, Fig. 9; and Fig. 9 is an enlarged horizontal sectional view of part of the machine, taken on the line $c'\,c'$, Fig. 8.

A in the drawings represents the frame of my improved machine, made of metal or other appropriate material. In this frame A are the bearings of a shaft, $e$, to which rotary motion is imparted by a belt, $a$, or otherwise. This shaft, by bevel-wheels $d\,b$, or by other suitable means, turns two rollers, B and D, that are journaled in the frame A. There are two rollers, B B, close to one another, and also two rollers, D D, close to one another. That one of the rollers B which is turned by the shaft $e$ serves to turn the other roller B by gear-connection $f$. In like manner the rollers D D are geared together to move in unison, but in opposite directions. The rollers B B and D D may be grooved circumferentially, as at $g$, for receiving the wire $h$ from the reel.

E is a shaft journaled in suitable bearings in the frame A. It carries the loose pulleys F F², which are revolved in opposite directions by means of belts F³ or other mechanism. The shaft E carries a sliding clutch, $i$, which revolves with said shaft, preferably by means of a feather on the shaft passing into a groove in said clutch $i$. The clutch $i$ has toothed ends, which are adapted to engage with corresponding teeth on the pulleys F F². The clutch $i$ may be moved along the shaft E by means of a crank-arm, $j$, which projects from a rock-shaft, G. The arm $j$ carries a pin, $l$, which projects into a groove, $m$, in the clutch $i$. By causing the clutch $i$ to engage the pulleys F F² alternately the motion of the shaft E will be reversed, for the purposes hereinafter stated.

The shaft E carries a pinion, $n$, which gears with a spur-wheel, $o$, on a shaft, H, suitably journaled in bearings in the frame A. The shaft H also carries a cam, $p$. (Best seen in Fig. 1.)

J is a lever, which at $q$ is pivoted to the frame A. One end of the lever J bears against the cam $p$, and is held against said cam by means of a spring, $r$. The opposite end of lever J is pivoted to one end of a rod, L. The other end of said rod L is attached to a lug, $s$, projecting from a sliding rod, $t$, carried in suitable bearings in the frame A. The rod L may be lengthened and shortened by means of a threaded sleeve, $u$, or by other suitable means. To one end of the rod $t$ is pivoted at $v$ the shank $w$ of a former or anvil, M. The shank $w$ passes back of the rollers B and D. The former M is at the left of the feed-rollers B B and is adapted to bear against the wire $h$ as it issues from between the rollers B B. As the cam $p$ revolves it moves the former M longitudinally by means of lever J and rod L, as will be more fully hereinafter stated.

The former M may carry a projection, $m^3$, adapted to abut against a set-screw, $n^3$, or other stop to limit the travel in one direction of said former; but these stops may be dispensed with, if desired. The shank $w$ of the former M also passes through a sleeve, $a^2$, which is pivoted to a sliding rod, N, suitably carried in frame A. The rods L and N are at substantially right angles. The rod N receives motion in the direction of its length toward the front of the machine from a cam, O, carried by a shaft, P, suitably journaled at the back of the frame A. The rod N is pressed toward the cam O by means of a powerful spring, $b^2$, secured to the frame A and bearing against the front end of rod N. This reciprocating movement of the rod N imparts lateral movement to the former M by means of sleeve $a^2$ and shank $w$. The inner edge, $f^2$, of the former M rides along a longitudinally-adjustable guide-block, $g^2$, on the frame A, which prevents the former M and rod N from being pressed inward by the spring $b^2$ until the proper moment, as will be hereinafter stated.

The rod N carries a knife, $d^2$, which is arranged to pass across the face of a block, $e^2$, between the rollers B B and D D, through which block $e^2$ the wire $h$ passes, the knife serving to cut off the wire at the proper moment. A rod, $h^2$, has one end pivoted to the rod N. Its other end carries a pin, $i^2$, which projects into an arched slot or groove of a plate, $l^2$, which is centrally attached to the end of the rock-shaft G. The rod $h^2$ is vibrated on its pivot by means of a cam, $m^2$, on shaft P and connecting-rods $n^2$ $n^2$, Fig. 2. This vibratory movement of rod $h^2$ moves the pin $i^2$ from one end of groove in plate $l^2$ to the other end, for the purpose hereinafter shown.

Q is a rod sliding in suitable bearings in the frame A, preferably parallel to rod N, and adapted to be pressed toward the front of the machine by means of a cam, $p^2$, carried by the shaft P. At the end of rod Q opposite the cam $p^2$ is pivoted a short rod, $q^2$, adapted to press against the edge $f^2$ of the former M. The rod $q^2$ is preferably apertured in its free end and receives the shank of a cap-piece, $r^2$. A spiral spring, $s^2$, within the aperture in rod $q^2$ presses the cap $r^2$ outward. The rod Q is moved toward the cam $p^2$, preferably by means of a spring, $w^2$, attached at one end to the rod Q and at its other end to a suitable part of frame A.

Intermittent rotary motion is imparted to the shaft P by means of a clutch, R, which engages a loose pulley, S, on said shaft P. The clutch R is operated at the proper moment from the former M through the connecting-rods $o^2$ $o^2$.

The clutch R is old and of well-known construction and needs no further explanation; but any suitable clutch may be used.

T, Fig. 4, is a slotted guide-plate secured to the frame A and arranged to receive the wire $h$ from the former M and rollers B B, as hereinafter described.

$j^2$ $j^2$ are a series of wire guides and straighteners. A spring, $t^2$, secured to the frame A and to a lug, $u^2$, on rod $t$, assists in pressing the former M away from the rollers B B. Instead of spring $t^2$ a spring, $v^2$, connecting with lug $s$, may be used. The pivot $q$ of lever J is by preference carried by a clamp, W, in which the lever is secured to regulate the lengths of its respective arms. This is shown in Fig. 7. The belt passing over pulley S and the belts $F^3$ and $a$ may be driven by one shaft, so that said belts may start and stop simultaneously.

I will first describe the operation of my machine in forming wire into coils that are larger in diameter in the middle than toward both ends.

When the machine is ready to be started, the parts assume the following positions: The wire $h$ is first passed from the rollers $j^2$ to the rollers D D, which pass it along through the block $e^2$ and against the blade of the knife $d^2$, which at this time has been carried into the inward position over the aperture in block $e^2$ by the rod N. A narrow part of the cam O at this time is opposite the inner end of the rod N, which permits this inward movement of said rod N. The former M is now in the inward position or that shown in Fig. 6—that is, entirely out of line of the wire, being carried there by the inward movement of the rod N. The former M has also been moved toward the rollers B B by the longer portion of cam $p$ having moved to the left, thereby pressing the upper part of the lever J toward the left and the lower part toward the right, thereby drawing the former M to the right also. The end of rod Q is at this time in contact with a wide part of cam $p^2$, being held there by spring $w^2$, and the rod $q^2$ is pushed to the right by the former M, as seen in Fig. 6. The rod Q is now in the outward position. The clutch R has been thrown by the rods $o^2$ into gear with pulley S, owing to the inward movement of the former M. The machine is now started by revolving the shafts P and $e$ and the pulleys F $F^2$ simultaneously. The first movement produced by the rotation of the shaft P is to press a wide part of the cam O against the end of the rod N, forcing said rod outward, thereby moving the knife $d^2$ away from contact with the end of the wire $h$. The wire is immediately carried along to and between the rollers B B by the revolution of the rollers D D, caused by the revolution of the shaft $e$, until the end of the wire extends slightly in front of the former M, as in Fig. 6. At about the same time the rod Q is drawn inward by the spring $w^2$, said revolution of the shaft P bringing a narrow part of the cam $p^2$ opposite the end of the rod Q, thus permitting the inward movement of the rod Q. This inward movement of rod Q draws the cap-piece $r^2$ out of the recess $x^2$ in the former M. The rod $q^2$ is now pushed toward the left by a spring, $y^2$, which brings the cap-piece $r^2$ behind the edge $f^2$ on the former M. (Best seen in Figs. 2 and 5.) As the shaft P still revolves, the cam $p^2$ then immediately presses the rod Q outward, which movement is simultaneous with and near the end of the just-described outward movement of the rod N. Both rods N and Q now force the former M outward until the edge $f^2$ comes in line with the outer edge of the guide $g^2$. By this time the outward movement of the former M has disengaged the clutch R from the pulley S by means of the rods $o^2$, which brings the shaft P to rest, said shaft having made only a half-revolution. The rods N and Q have now stopped moving. By this outward motion of former M the wire $h$, projecting from rollers B B and against the former M, has been bent in the arc of a circle and passes into the slot in guide T. When the rod N moves toward the front of the machine, as above stated, it draws on the pivoted rod $h^2$, (which has first been moved into the left-hand position, Fig. 2, by cam $m^2$ on the shaft P and connecting-rods $n^2$,) which outward movement given by rod N to the rod $h^2$ draws the plate $l^2$ and arm $j$, and thereby the clutch $i$, into the position shown in Fig. 2, locking the rotating pulley F to the clutch $i$, thereby revolving the shaft E and spur-wheel $o$ on shaft H by means of pinion $n$. As the shaft H revolves it revolves the cam $p$, which revolution gradually presents the narrow part of said cam $p$ to the lever J. This allows the upper end of the lever J to be drawn toward the right by the spring $r$, thereby moving the lower end of lever J to the left and moving the former M, by means of rod L and slide $t$, toward the left, by this means enlarging the distance between the point $z^2$ of the former M and the rollers B B. This gradually enlarges the diameter of the spiral coil U, as the wire $h$ has been passing into the machine and against the receding former all this time, being curled by contact with the former M and by its passage through the slot of the guide T, which slot is out of line with the level on which the wire moves in the rollers B B.

From the above it will be seen that as the former M moves outward to bend the end of the wire $h$ the clutch $i$ is thrown in gear with the pulley F to revolve the cam $p$, so that when the former has been moved to its fullest extent outward it will immediately move away from the rollers B B to gradually enlarge the diameter of the coil.

When the upper end of the lever J is on the narrow part of cam $p$, the former M will be at the greatest distance from the rollers B B, which gives the greatest diameter to the spiral U. As the cam $p$ still revolves, the upper end of the lever J will be pressed gradually to the left by the wide part of the cam $p$, thereby pushing on rod L and narrowing the distance between the former M and the rollers B B, and consequently narrowing the diameter of the spiral U.

As the former M moves toward the left, away from rod $q^2$, cap-piece $r^2$ springs out behind the former into the recess $x^2$. (See Fig. 6.) By causing the cap-piece $r$ to spring into the recess $x^2$, away from the edge $f^2$, the former M on the return-stroke to the right will push the cap-piece $r$, and thereby the short rod $q^2$, to the right. This keeps said rod $q^2$ away from the edge $f^2$ on the return-stroke of the former M.

When the former M has been moved to the right far enough to form the smallest diameter of the spiral desired, the edge $f^2$, under the influence of the strong spring $b^2$ and sleeve-connection $a^2$, slips off the edge of the guide $g^2$, being permitted to do so by its first having moved the cap-piece $r$ and rod $q^2$ away from the edge $f^2$, as before described. A narrow part of the cam O is at this time opposite the inner end of the rod N, which permits the rod N to be moved inward by the strong spring $b^2$ as the former M slips off the guide $g^2$. As the rod N moves inward, it carries the knife $d^2$ with it, which knife, passing across the face of block $e^2$, cuts the wire $h$ off. This finishes one of the coils. As this inward movement of rod N and former M takes place the clutch R is thrown in gear with pulley S by means of the rods $o^2$, ready to revolve the shaft P to press the rods N and Q outward again, as first described.

Each time a spiral, U, is made and cut off the above described operation is gone through with.

Every alternate time the rod N is moved inward the cam $m^2$ moves the rod $h^2$ from one end of slot $j^2$ to the other by means of the links $n^2$, and as rod N next moves outward the rod $h^2$ draws upon one end of plate $l^2$, giving the shaft G a slight turn, which throws the clutch $i$ into contact with the opposite pulley, F or $F^2$, to reverse the motion of shaft E, and thereby of cam $p$. This reverse movement of cam $p$ gives the same outward and inward movement to lever J, and thereby to the former M, as that first described. By oscillating the cam $p$, I make each coil U first narrow, then wide, and then again narrow, or first wide, then narrow, and then wide again, according as the cam is mounted upon its shaft. Where a straight coil is to be made, the cam $p$ may be quite round and may revolve continuously, or may be entirely dispensed with, as the former would in that case require no motion to the right and left. In other words, the motion of the former to the right and left controls the diameter of the coil produced, while the motion of the former M, at right angles to the feed of the wire, serves to start each coil, to set the shaft P into action, and to allow the rod N to cut the wire. The guide T may be slanted more or less to determine the distance desired between the convolutions of the coil U.

To vary the diameter of different coils the clamp W may be moved up or down along the lever J, which lengthens or shortens the longitudinal movement allowed to the former M. The rod L may also be shortened or lengthened to correspond by means of the sleeve $u$. The guide $g^2$ may be adjusted longitudinally to determine the time at which the former M shall slip off it to vary the diameter of different coils at the ends.

When it is desired to make a coil having a taper toward one end only, the former M will be started, preferably, from the outward position, which makes the largest diameter to the coil, and caused to move toward the rollers B B, and when the edge $f^2$ slips off the guide $g^2$ the knife $d^2$ will cut the wire $h$, as before described. By making the cam $p$ with a suitable hollow part the upper end of the lever J will move quickly toward the right after each spiral is finished, thereby drawing the former M away from rollers B B to the farthest position. If it is desired to form a series of coils in succession on one wire, it is only necessary to remove the knife $d^2$ to prevent the cutting of the wire.

When a coil is desired of a uniform diameter throughout, the former M will be adjusted away from rollers B B to the desired distance and the belts on pulleys F, $F^2$, and S thrown off, or the rod $h^2$ be disengaged from rod N, when the former M will have no movement, but be retained in the desired position, while the wire $h$ keeps passing from the rollers B B and D D.

A very operative machine is obtained if a stationary or adjustable former, M, is used in connection with suitable feed-rollers and means for slanting the wire. The more the slot of the guide T is carried away from the plane of the feed of the wire the farther will the convolutions of the coil be from one another.

Having now described my invention, what I claim is—

1. The rollers B B, for passing the wire along, in combination with a longitudinally-movable former, M, pivoted at one end to a slide, $t$, and adapted to turn the wire in the arc of a circle, and with means, substantially as described, for turning said former on its pivot and moving it laterally in and out of the path of the wire, as specified.

2. The rollers B B, combined with the former M, and means, substantially as described, for moving said former M longitudinally to increase and diminish the diameter of the coil and laterally into the path of a passing wire to turn the same in the arc of a circle and again laterally out of the path of the wire, as and for the purpose specified.

3. The rollers B B, adapted to pass the wire to a former, M, in combination with said former and with a knife, $d^2 e^2$, and with means for moving the knife $d^2$ at right angles to the wire to cut the same, the knife $d^2$ being arranged to move in unison with the former, substantially as herein shown and described.

4. The former M, adapted to turn aside a wire, $h$, from suitable rollers, in combination with the rod L, connected with the former M, and lever J, connected with rod L, and with means for oscillating said lever J, and thereby moving said former M toward and from the feed-rollers, substantially as described.

5. The pivoted former M and means for reciprocating it longitudinally, in combination with the rod N, spring $b^2$, and cam O, for moving said former laterally, substantially as described.

6. The rollers B B and pivoted former M, in combination with the rod N, adapted to move said former laterally, and with the knife $d^2$, carried by the rod N, and stationary block $e^2$, for cutting the wire, the knife $d^2$ being arranged to move in unison with the former M, substantially as described.

7. The former M, rod N, and sleeve $a^2$, connecting the rod N pivotally with the former M, in combination with said rod and with a rod, Q, and cam $p^2$, the rods N and Q acting to press the former outward to turn a passing wire in the arc of a circle, substantially as described.

8. The lever J, the pivoted former M, and means for connecting them, the cam $p$, and means for rotating said cam, whereby the former is reciprocated longitudinally, in combination with the rod N, spring $b^2$, and cam O, for moving the former laterally, substantially as set forth.

9. The former M, lever J, and means connecting the former with the lever J, cam $p$, shaft H, and spur-wheel $o$, in combination with shaft E, having pinion $n$, loose pulleys F and $F^2$, driven in opposite directions, and clutch $i$, adapted to revolve with said shaft E, and to be thrown in gear alternately with pulley F or $F^2$, to reverse the motion of cam $p$, substantially as described.

10. The former M, lever J, connected with the former, cam $p$, and means connecting the cam $p$ with a shaft, E, shaft E, clutch $i$, and loose pulleys F and $F^2$ on shaft E, in combination with arm $j$, shaft G, and with means for rocking the shaft C to move the clutch $i$ on the shaft E, substantially as described.

11. The combination of the former M, cam $p$, and means connecting the former with the cam, shaft E, and means connecting the shaft with the cam, clutch $i$, and means for revolving the clutch in opposite directions, shaft G, having arm $j$ and centrally-connected slotted plate $l^2$, rod $h^2$, in movable connection with plate $l^2$, and rod N, for moving the rod $h^2$ longitudinally and thereby rocking said shaft G, substantially as described.

12. The former M, lever J, connected with the former, cam $p$, shaft E, and means connecting the shaft with the cam, clutch $i$, and means for rotating said clutch, shaft G, connected with the clutch, slotted plate $l^2$, and rod $h^2$, connected at one end to rod N and at its other end to the slotted plate $l^2$, for rocking the shaft G, in combination with the rod N, cam $m^2$, shaft P, and connecting-rods $n^2$, for moving rod $h^2$ laterally, substantially as described.

13. The rod N, for moving the former M, and the rod Q, carrying pivoted rod $q^2$, to assist in pressing the former M outward, in combination with said former and with shaft P, cams O and $p^2$, for moving rods N and Q, clutch R, rods connecting the former with the clutch R, and pulley S, substantially as described.

14. The former M, connected to rod N and arranged to be moved laterally by said rod, in combination with said rod N and with clutch R, rods connecting the clutch with the former, pulley S, shaft P, and cam O, substantially as described.

FRANK M. LEAVITT.

Witnesses:
J. STETTHEIMER, Jr.,
HARRY M. TURK.